United States Patent
Kawaguchi et al.

(10) Patent No.: US 9,343,219 B2
(45) Date of Patent: May 17, 2016

(54) REACTOR, CONVERTER, POWER CONVERTER APPARATUS, AND METHOD FOR MANUFACTURING REACTOR

(75) Inventors: Hajime Kawaguchi, Osaka (JP); Hideo Tawara, Yokkaichi (JP); Takahiro Onizuka, Yokkaichi (JP); Akinori Ooishi, Yokkaichi (JP)

(73) Assignees: Sumitomo Electric Industries, Ltd., Osaka-shi (JP); Sumitomo Wiring Systems, Ltd., Yokkaichi-shi (JP)

( * ) Notice: Subject to any disclaimer, the term of this patent is extended or adjusted under 35 U.S.C. 154(b) by 0 days.

(21) Appl. No.: 14/122,630

(22) PCT Filed: Mar. 14, 2012

(86) PCT No.: PCT/JP2012/056585
§ 371 (c)(1),
(2), (4) Date: Nov. 26, 2013

(87) PCT Pub. No.: WO2012/164998
PCT Pub. Date: Dec. 6, 2012

(65) Prior Publication Data
US 2014/0112044 A1    Apr. 24, 2014

(30) Foreign Application Priority Data

May 31, 2011 (JP) ................................. 2011-121249
Nov. 14, 2011 (JP) ................................. 2011-249058

(51) Int. Cl.
*H01F 27/02* (2006.01)
*H01F 27/32* (2006.01)
(Continued)

(52) U.S. Cl.
CPC .............. *H01F 27/022* (2013.01); *H01F 27/02* (2013.01); *H01F 27/32* (2013.01); *H01F 41/04* (2013.01); *H02M 7/539* (2013.01); *H01F 27/306* (2013.01); *Y10T 29/49073* (2015.01)

(58) Field of Classification Search
CPC ......... H01F 27/00; H01F 27/02; H01F 27/04; H01F 27/28; H01F 27/29; H01F 27/30
USPC ..................... 336/65, 83, 200, 206–208, 212, 336/233–234
See application file for complete search history.

(56) References Cited

U.S. PATENT DOCUMENTS

2010/0209314 A1    8/2010    Sato

FOREIGN PATENT DOCUMENTS

| CN | 101689420 A | 3/2010 |
| JP | 2007-243131 A | 9/2007 |

(Continued)

OTHER PUBLICATIONS

International Search Report issued in International Patent Application No. PCT/JP2012/056585 dated Jun. 19, 2012.
(Continued)

*Primary Examiner* — Tuyen Nguyen
(74) *Attorney, Agent, or Firm* — Venable LLP; Michael A. Sartori; F. Brock Riggs

(57) ABSTRACT

The present invention is directed to a reactor 1 including a combined product 10 made up of a coil member 2 and a magnetic core 3, and a case 4 storing the combined product 10. The case 4 is formed by a combination of a side wall portion 41 surrounding the combined product 10 and a bottom plate portion 40 being a member separate from the side wall portion 41. Between the bottom plate portion 40 of the case 4 and the coil member 2 (coils 2a and 2b), an insulating sheet 42 is interposed. In order to fabricate the reactor 1, the insulating sheet 42 is disposed on the bottom plate portion 40, and the combined product 10 is disposed on the insulating sheet 42. Then, the side wall portion 41 is disposed from above the combined product 10, and the side wall portion 41 and the bottom plate portion 40 are engaged with each other.

9 Claims, 6 Drawing Sheets

(51) Int. Cl.
*H01F 41/04* (2006.01)
*H02M 7/539* (2006.01)
*H01F 27/30* (2006.01)

(56) References Cited

FOREIGN PATENT DOCUMENTS

| JP | 2008-021688 A | | 1/2008 |
| JP | 2008305854 A | * | 12/2008 |
| JP | 2009-218292 A | | 9/2009 |
| JP | 2009-246222 A | | 10/2009 |
| WO | WO-2006/016554 A1 | | 2/2006 |
| WO | WO-2009/125593 A1 | | 10/2009 |
| WO | WO 2010021113 A1 | * | 2/2010 |

OTHER PUBLICATIONS

Notification of the First Office Action in Chinese Patent Application No. 201280027068.8, dated Sep. 1, 2015.

* cited by examiner

REACTOR, CONVERTER, POWER CONVERTER APPARATUS, AND METHOD FOR MANUFACTURING REACTOR

TECHNICAL FIELD

The present invention relates to a reactor used as a constituent component of a power converter apparatus such as an in-vehicle DC-DC converter mounted on a vehicle, e.g., a hybrid vehicle, a converter including the reactor, a power converter apparatus including the converter, and a method for manufacturing a reactor.

BACKGROUND ART

A reactor is one of the components of a circuit that performs a voltage step up or step down operation. For example, Patent Literature 1 discloses a reactor that is used for a converter mounted on a vehicle such as a hybrid vehicle. The reactor includes a combined product being a combination of a coil member having a pair of coils coupled to each other in a paralleled state and an annular magnetic core fitted into the coils so as to penetrate through the coils. Further, there is another type of reactor in which the combined product is stored in the case and then sealed with resin.

In connection with the reactor including such a case, generally the case is made of metal because it is necessary to dissipate the heat generated at the coil member in operation. For example, as the case, an aluminum die-cast product is used. With the reactor including such a metal-made case, the coil member of the combined product and the bottom face of the case need to be electrically insulated from each other. Accordingly, conventionally, the combined product is fixed to the bottom face of the case by, for example, applying an adhesive agent being an insulating resin to the bottom face of the case, to secure electrical insulation between the bottom face of the case and the coil member of the combined product by an insulating layer, which is formed by the adhesive agent being cured.

CITATION LIST

Patent Literature

Patent Literature 1: Japanese Unexamined Patent Publication No. 2008-21688

SUMMARY OF INVENTION

Technical Problem

However, the reactor of the conventional structure involves a problem of poor productivity.

With an insulating layer being a cured insulating resin, pinholes tend to be produced when the insulating resin is applied to the bottom face of the case or when the insulating resin cures. Accordingly, such an insulating resin-made insulating layer needs to be formed by multitude of layers. Such repetitive application and curing of the insulating resin requires time and effort, resulting in a reduction in productivity of the reactor.

Further, with the conventional structure, time and effort may be also required for disposing the combined product in the case. When applying the insulating resin to the bottom face of the case having a certain depth or when disposing the combined product at a prescribed position in the case, the side wall of the case becomes an obstacle. Further, when application of the insulating resin to the bottom face of the case becomes uneven or the position of the combined product in the case is displaced from the prescribed position, it disadvantageously becomes difficult to connect the completed reactor to other electrical component.

The present invention is made under the circumstances described above, and an object of the present invention is to provide a reactor that can be manufactured with excellent productivity, and a manufacturing method therefor. Further, other object of the present invention is to provide a converter including the reactor and a power converter apparatus including the converter.

Solution to Problem

The present invention achieves the objects stated above by employing the case of a dividable structure, and by having an insulating sheet interposed between the case and the coil.

A reactor of the present invention includes a coil member having a pair of coils being coupled to each other in a paralleled state, an annular magnetic core penetrating through the coils, and a case storing a combined product made up of the coil member and the magnetic core. The case included in the reactor of the present invention has a side wall portion surrounding the combined product, and a bottom plate portion being a member separate from the side wall portion. The reactor of the present invention further includes an insulating sheet interposed between the bottom plate portion and the coil member.

It can be said that the reactor of the present invention is a reactor that is manufactured highly productively. That is because, unlike conventional ones, it is not necessary to repeat application and curing of an insulating resin, and electrical insulation can be secured between the bottom plate portion and the coil member just by disposing an insulating sheet, which is originally free of defects such as pinholes, between the bottom plate portion of the case and the coil of the combined product. Further, with the reactor of the present invention, since the case is structured by a combination of the bottom plate portion and the side wall portion, the side wall portion of the case does not constitute an obstacle in manufacturing the reactor. That is, employing the case of such a dividable structure, the insulating sheet can be disposed easily at a prescribed position of the bottom plate portion, and also the combined product can be disposed easily at a prescribed position on the insulating sheet thereof. Hence, the reactor of the present invention is excellent in productivity. Here, unlike the structure of the present invention, when the insulating sheet is used with the case not in a dividable structure, the insulating sheet is not easily disposed at the case bottom face and the combined product is not easily disposed in the case. Hence, as compared to the structure of the present invention, its productivity is largely reduced.

On the other hand, a method for manufacturing a reactor of the present invention is a method for manufacturing a reactor which includes a coil member having a pair of coils being coupled to each other in a paralleled state, an annular magnetic core penetrating through the coils, and a case storing a combined product made up of the coil member and the magnetic core. The method is characterized by including the following steps A to D.

[Step A] . . . Prepare a combined product.

[Step B] . . . Prepare a side wall portion and a bottom plate portion that form a case when being combined with each other.

[Step C] . . . Place the combined product on the bottom plate portion in a state where an insulating sheet is interposed between the bottom plate portion and the coil member.

[Step D] . . . Allow the side wall portion and the bottom plate portion to engage with each other to surround the combined product placed on the bottom plate portion.

According to the method for manufacturing a reactor of the present invention, electrical insulation between the case and the coil member can be secured just by allowing the insulating sheet to be interposed between the bottom plate portion of the case and the coil member of the combined product. Further, the case is in a dividable structure. Still further, the case is completed by the combined product being positioned on the bottom plate portion, followed by the bottom plate portion being engaged with the side wall portion. Accordingly, positioning of the combined product in the case can be easily and accurately performed. This is because, at the time when the combined product is placed on the bottom plate portion, the side wall portion that would hinder such a placing work is not present.

In the following, a detailed description will be given of preferred embodiments of the reactor of the present invention.

According to one embodiment of the reactor of the present invention, the insulating sheet is one of amide-imide resin, polyimide resin, epoxy resin, and polyester resin.

The amide-imide resin exhibits excellent heat resistance, and therefore excellent electrical insulation can be secured in the reactor that reaches high temperatures. Further, the polyester resin is inexpensive and can be purchased with ease. Still further, the polyimide resin exhibits excellent heat resistance and insulating characteristic. The epoxy resin exhibits an excellent insulating characteristic, and can also serve as an adhesive agent.

According to one embodiment of the reactor of the present invention, it is preferable to include an adhesive agent layer disposed at least at one of a position between the bottom plate portion and the insulating sheet and a position between the insulating sheet and the coil member. It goes without saying that it is most preferable to include the adhesive agent layer disposed at both of the positions, i.e., between the bottom plate portion and the insulating sheet and between the insulating sheet and the coil member.

Provision of the adhesive agent layer can effectively prevent misalignment of the combined product in the case.

According to one embodiment of the reactor of the present invention, it is preferable that the adhesive agent layer is obtained by curing of one of the silicone resin, the acrylic resin, and the epoxy resin.

Since the resin is excellent in thermal conductivity, heat can be effectively transferred from the coil member to the insulating sheet, and from the insulating sheet to the bottom plate portion of the case.

According to one embodiment of the reactor of the present invention, it is preferable to include a pressing member pressing the combined product against the bottom plate portion.

The pressing member may be a leaf spring whose one end is fixed to the side wall portion or to the bottom plate portion, and whose other end presses the top face of the combined product. Alternatively, it may be an overhead bridge-like (inverted U-shaped) fixing fitting (see a second embodiment which will follow) having its opposite ends fixed to the side wall portion or the bottom plate portion, and having its intermediate portion pressing the top face of the combined product. In order to fix the combined product to the bottom plate portion, the pressing member and the adhesive agent may be used in combination.

According to one embodiment of the reactor of the present invention, it is preferable that the side wall portion of the case is made of a resin material, and the bottom plate portion of the case is made of a metal material.

From the viewpoint of reducing the weight of the reactor, the case is preferably made of a lightweight material such as a resin material. However, since the case also serves to dissipate heat generated at the coil member of the reactor, it is preferable for the case to be made of a metal material. In accordance therewith, with the structure as described above, in which the side wall portion is made of a resin material and the bottom plate portion is made of a metal material, a heat dissipating characteristic and a reduction in weight can be both achieved.

The reactor of the present invention can be preferably used as a constituent component of a converter. According to one embodiment, a converter of the present invention includes a switching element, a driver circuit controlling an operation of the switching element, and a reactor smoothing a switching operation, wherein the converter converts an input voltage in accordance with the operation of the switching element, and the reactor is the reactor of the present invention. The converter of the present invention can be suitably used as a constituent component of a power converter apparatus. According to one embodiment, a power converter apparatus of the present invention includes a converter converting an input voltage, and an inverter connected to the converter to mutually convert a direct current and an alternating current, the power converter driving a load by power converted by the inverter, wherein the converter is the converter of the present invention.

The converter of the present invention including the reactor of the present invention being excellent in productivity and the power converter apparatus of the present invention including the same are also excellent in productivity.

Advantageous Effects of Invention

With the structure of the reactor of the present invention, the reactor can be manufactured highly productively. Further, according to a method of manufacturing a reactor of the present invention, the reactor of the present invention can be manufactured easily and in short time.

DESCRIPTION OF EMBODIMENTS

Figure 1:
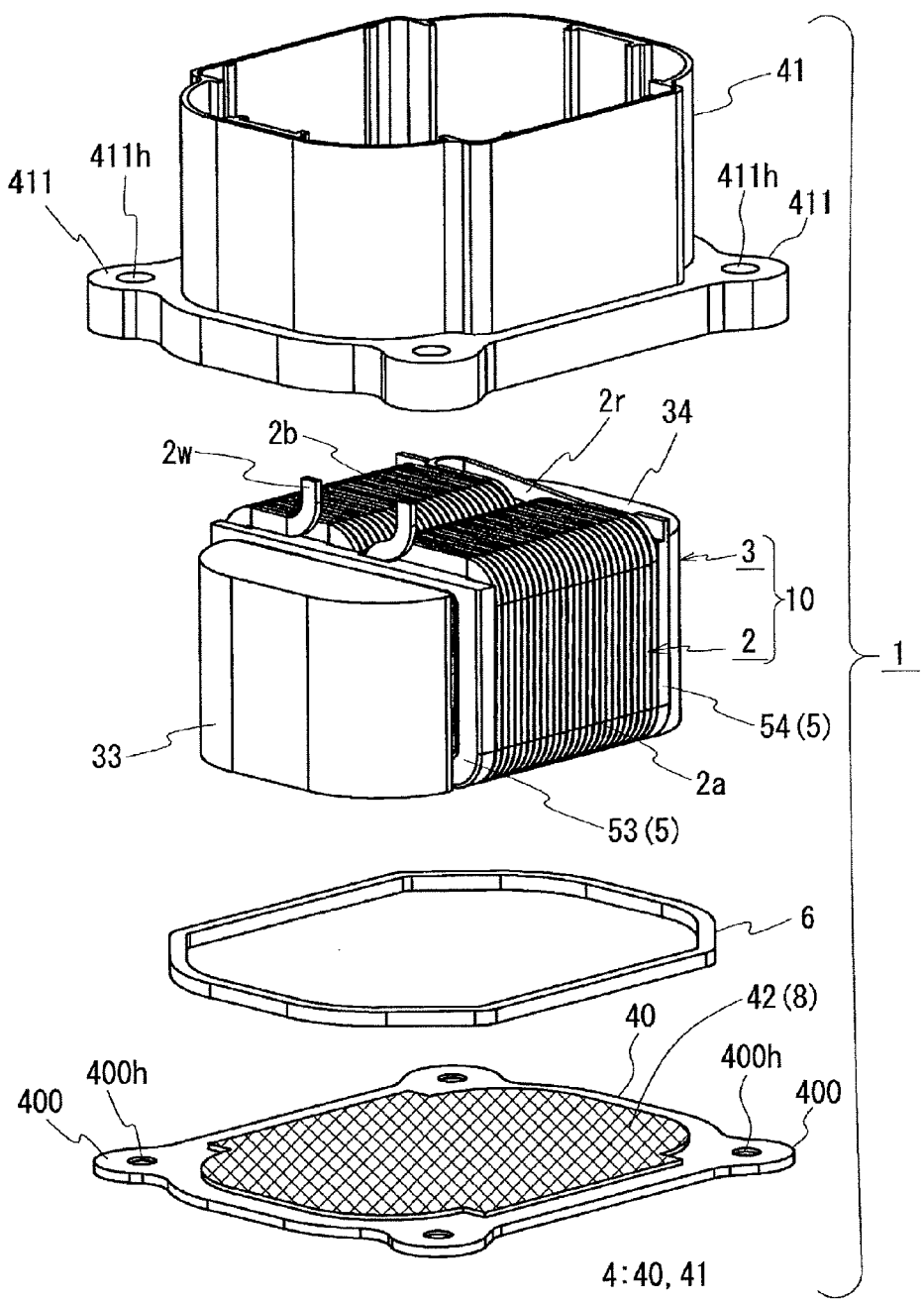
FIG. 1 is an exploded perspective view showing the overview of a reactor according to a first embodiment.

In the following, a description will be given of embodiments of the present invention. In the drawings, identical reference signs denote identically named elements.

First Embodiment

Overall Structure

Figure 2:
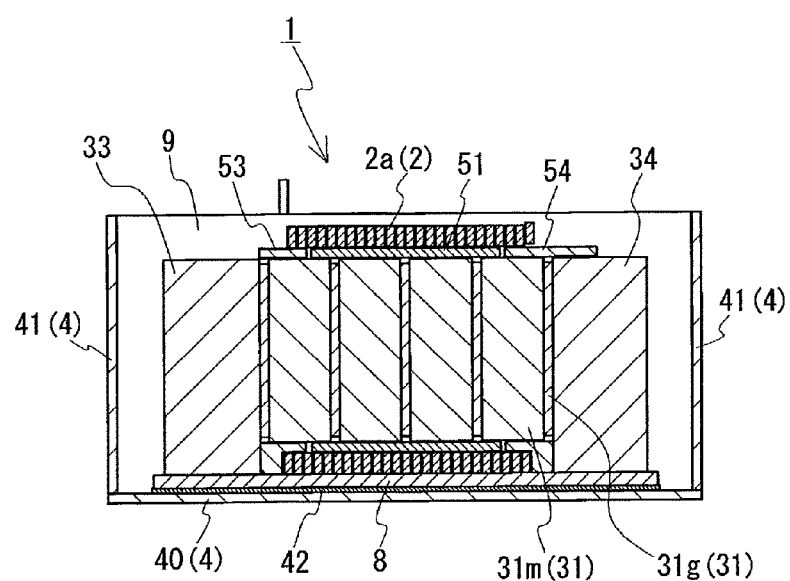
FIG. 2 is a schematic vertical cross-sectional view of the reactor according to the first embodiment.

A reactor 1 shown in FIGS. 1 and 2 includes a combined product 10 being a combination of a coil member 2 and a magnetic core 3, and a case 4 storing the combined product 10. The case 4 is a box-shaped element whose one face is open. The combined product 10 disposed in the case 4 is buried by a sealing resin 9 (see FIG. 2) except for the ends of the wire 2w forming the coil member 2. The reactor 1 is characterized the most by the following two points: [1] the case 4 is divided into a bottom plate portion 40 and a side wall portion 41; and [2] an insulating sheet 42 is interposed between the coil member 2 of the combined product 10 and the bottom plate portion 40 of the case 4. In the following, the constituents of the reactor 1 will be described in more detail. Subsequently, a method for manufacturing the reactor 1 will be described.

<<Combined Product>>

[Coil Member]

Figure 3:
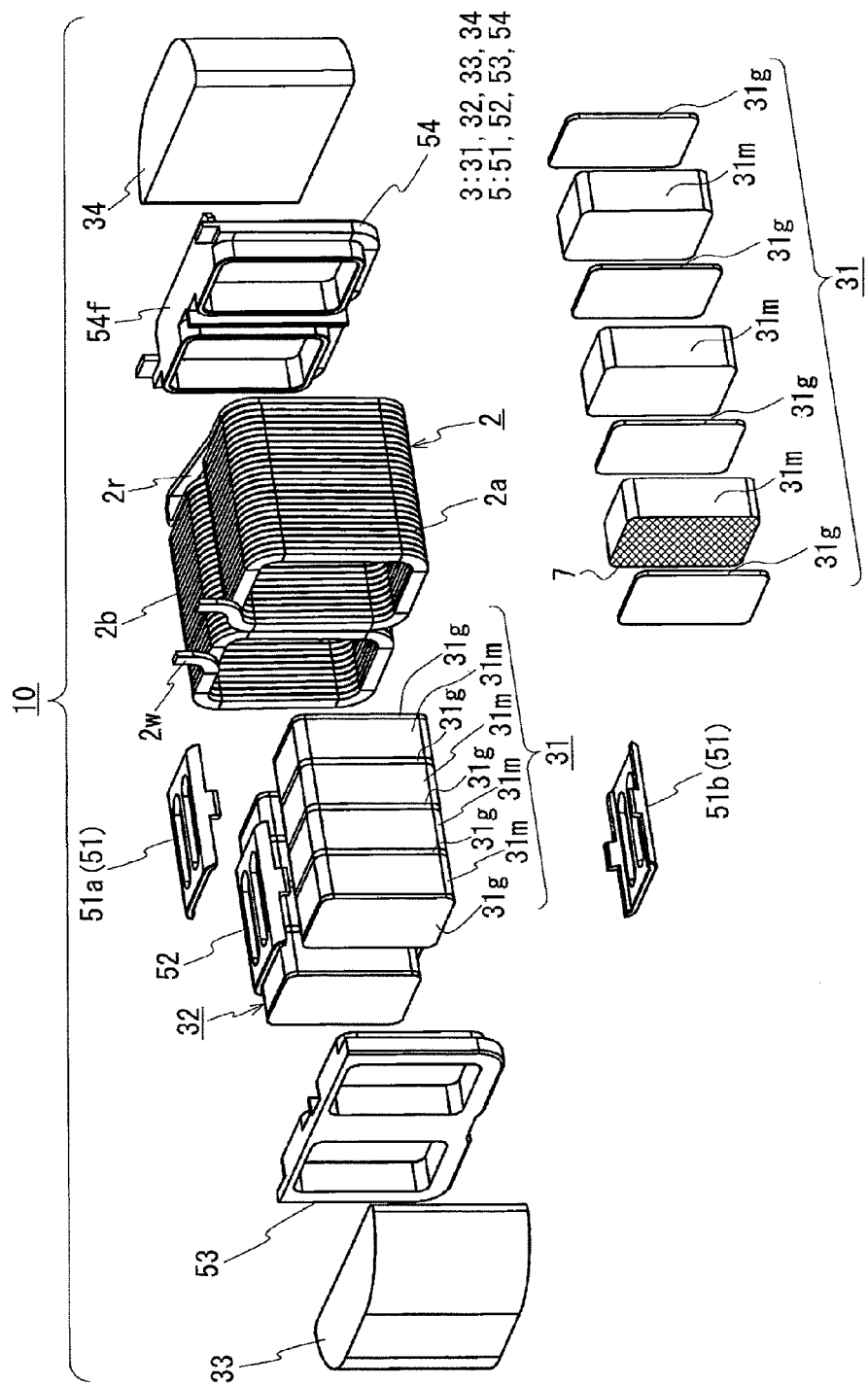
FIG. 3 is an exploded perspective view showing the overview of a combined product of the reactor shown in FIG. 1.

The coil member 2 structuring the combined product 10 will be described with reference to FIGS. 1 and 3 as appropriate. The coil member 2 includes a pair of coils 2a and 2b and a coil coupling portion 2r coupling the coils 2a and 2b to each other. The coils 2a and 2b are identical to each other in the number of turns and the winding direction. The coils 2a and 2b are each formed to be hollow square sleeve-like, and are laterally juxtaposed such that their respective axial directions are paralleled. Further, the coupling portion 2r is a portion, which is bent in a U-shape, connecting the coils 2a and 2b to each other on the other side (on the right side in FIGS. 1 and 3) of the coil member 2.

The coil member 2 according to the present embodiment is made of one wire 2w. The wire 2w is made of a rectangular conductor such as copper or aluminum provided with an insulating coat (representatively, polyimide-amide) on its outer circumference. The coils 2a and 2b are each formed to be square sleeve-like by the wire 2w being spirally wound edgewise. It goes without saying that the cross section of the wire 2w is not limited to rectangular, and it can be circular, elliptical, or polygonal. As to the winding shape also, it may be ellipsoidal sleeve-like. Note that, the coil member can be prepared by preparing the coils 2a and 2b with separate wires, and joining the ends of the wires forming the coils 2a and 2b to each other by welding or the like.

The opposite ends of the wire 2w forming the coil member 2 are appropriately drawn from the turn forming portion on one end side (on the left side in FIGS. 1 and 3) of the coil member 2 to the outside of the case 4. The insulating coat is peeled off from the drawn out opposite ends of the wire 2w. To each conductor portion exposed outside the insulating coat, a conductive terminal fitting (not shown) is connected. Via the terminal fitting, an external apparatus (not shown) such as a power supply that supplies power to the coil member 2 is connected.

[Magnetic Core]

A description will be given of the magnetic core 3 with reference to FIG. 3. The magnetic core 3 includes a pair of inner core portions 31 and 32 respectively disposed in the coils 2a and 2b, and a pair of outer core portions 33 and 34 exposed outside the coil member 2. The inner core portions 31 and 32 are respectively rectangular parallelepiped-shaped. The outer core portions 33 and 34 are each a columnar element with a dome-shaped face, for example. Respective one ends (on the left side in the drawing) of the inner core portions 31 and 32 disposed as being distanced from each other are connected to each other via one outer core portion 33, and respective other ends (on the right side in the drawing) of the core portions 31 and 32 are connected to each other via the other outer core portion 34. As a result, the annular magnetic core 3 is formed by the inner core portions 31 and 32 and the outer core portions 33 and 34.

The inner core portion 31 (32) is a lamination product in which divided cores (core pieces) 31m made of a magnetic material having a substantially rectangular parallelepiped-shape and gap plates 31g being lower in permeability than the divided cores 31m are alternately stacked, while the outer core portions 33 and 34 are each a columnar core piece having dome-shaped bottom face and top face. The core pieces may each be a molded product using magnetic powder, or a lamination product made up of a plurality of magnetic thin plates (e.g., electromagnetic steel sheets) provided with insulating coating being stacked. Note that, the magnetic characteristic can be differed between the divided cores 31m structuring the inner core portions 31 and 32 and the outer core portions 33 and 34 by using different magnetic materials.

The exemplary molded product forming each core piece may be: a powder magnetic core using powder of iron group metal such as Fe, Co, and Ni, Fe-base alloy such as Fe—Si, Fe—Ni, Fe—Al, Fe—Co, Fe—Cr, and Fe—Si—Al, rare earth metal, and a soft magnetic material such as an amorphous magnetic element; a sintered product obtained by sintering the above-noted powder having undergone press molding; and a hardened mold product obtained by subjecting a mixture of the above-noted powder and resin to injection molding, cast molding and the like. In addition, each core piece may be a ferrite core being a sintered product made of metal oxide. In particular, the molded product is preferable in that a magnetic core can be easily formed in any of various three-dimensional shapes.

On the other hand, the gap plates 31g may be made of a non-magnetic material such as alumina, glass epoxy resin, and unsaturated polyester, or it may be made of such a non-magnetic material in which a soft magnetic material is dispersed. With any material, it is selected such that the gap plates 31g become lower in permeability than the core pieces.

It is preferable to use an adhesive agent made of an insulating resin to bond the core pieces 31m, 33 and 34 and the gap plates 31g to one another. The cured insulating resin adhesive agent remains as an adhesive layer 7 between each ones of the core pieces 31m, 33 and 34 and the gap plate 31g. Note that, in FIG. 3, one of a plurality of adhesive layers 7 is cross-hatched in the exploded view of the inner core portion 31. However, practically, the adhesive layer 7 is formed between every ones of core pieces 31m, 33 and 34 and the gap plates 31g. As the insulating resin adhesive agent used herein, the same adhesive agent used for bonding the bottom plate portion 40 of the case 4 and the insulating sheet 42 to each other and for bonding the insulating sheet 42 and the combined product 10 to each other, which will be described later, can be used. Note that, it is preferable that the adhesive agent is of the room temperature curing type.

[Bobbin]

The combined product 10 according to the present embodiment includes a bobbin 5 for enhancing the insulating characteristic between the coil member 2 and the magnetic core 3. As the constituent material of the bobbin, an insulating material such as polyphenylene sulfide (PPS) resin, polytetrafluoroethylene (PTFE) resin and liquid crystal polymer (LCP) can be used. The bobbin 5 may be structured to include an inner bobbin 51 (52) disposed at the outer circumference of the inner core portion 31 (32), and a pair of frame-like bobbins 53 and 54 being abutted on the end faces of the coil member 2 (the faces where turns of the coil appear annularly).

The inner bobbin 51 is made up of a pair of bobbin pieces 51a and 51b each having a cross section of "]" shape and made of an insulating material (the inner bobbin 52 is structured in a similar manner). The bobbin piece 51a (51b) is structured to cover the entire top face (the entire bottom face) and part of the left face and the right face of the inner core portion 31. Accordingly, the bobbin pieces 51a and 51b attached to the inner core portion 31 are not brought into contact with each other. Employing such a structure, the material of the inner bobbin 51 (52) can be reduced, and the contact area between the inner core portion 31 (32) and the sealing resin can be increased. Note that, the inner bobbin 51 may be a sleeve-like element that is disposed along the entire outer circumference of the inner core portion 31 when being attached to the inner core portion 31.

The frame-like bobbins 53 and 54 are each flat plate-shaped, with a pair of opening portions into which the inner core portions 31 and 32 are respectively inserted. Further, the frame-like bobbins 53 and 54 have short sleeve-like portions projecting toward the inner core portions 31 and 32 so as to facilitate insertion of the inner core portions 31 and 32. Further, on the frame-like bobbin 54, a flange portion 54f on which the coil coupling portion 2r is placed is provided for insulating between the coil coupling portion 2r and the outer core portion 32.

Note that, in place of the inner bobbins 51 and 52, an insulating sheet may be wound around the outer circumference of the inner core portions 31 and 32. For example, since a silicone sheet possesses an excellent electrical insulating characteristic and exhibits high thermal conductivity, the silicone sheet fully exhibits the functions similar to those of the inner bobbins 51 and 52.

<<Case>>

A description will be given of the case 4 with reference to FIG. 1. The case 4 storing the combined product 10 includes the flat plate-like bottom plate portion 40 and the side wall portion 41 provided to stand upright from the bottom plate portion 40. The bottom plate portion 40 and the side wall portion 41 are structured as separate members.

[Bottom Plate Portion and Side Wall Portion]

(Bottom Plate Portion)

The bottom plate portion 40 is a quadrangular plate being fixed to the fixation target when the reactor 1 is installed in the fixation target such as a cooling base. The bottom plate portion 40 has flange portions 400 respectively projecting from the four corners. The flange portions 400 are each provided with a bolt hole 400h through which a bolt (not shown) for fixing the case 4 to the fixation target is inserted. The bolt holes 400h are provided so as to be continuous to bolt holes 411h of the side wall portion 41, which will be described later. The bolt holes 400h and 411h each can be a through hole not being threaded or a threaded hole being threaded. Also, the number of the bolt holes 400h and 411h can be selected as appropriate.

(Side Wall Portion)

The side wall portion 41 is a sleeve-like frame element. The side wall portion 41 is disposed to surround the combined product 10 when the case 4 is assembled, with its one opening portion closed by the bottom plate portion 40 and its other opening portion being opened. Here, in connection with the side wall portion 41, when the reactor 1 is disposed at the fixation target, the region becoming the installation side is quadrangular conforming to the outer shape of the bottom plate portion 40, and the region on the opening side is in a curved plane shape conforming to the outer circumferential face of the combined product 10.

In addition, the side wall portion 41 may be provided with a terminal block (not shown) to which terminal fittings can be fixed. For example, an overhanging portion should be provided to cover the substantially trapezoidal face of the outer core portion 33 at the top opening portion of the case 4 shown in FIG. 1, and the top face of the overhanging portion should be used as the terminal block.

(Attaching Place)

At the region on the installation side of the side wall portion 41, similarly to the bottom plate portions 40, attaching places provided with the flange portions 411 respectively projecting from the four corners are formed. The flange portions 411 are provided with the bolt holes 411h. The bolt holes 411h may be formed solely of the constituent material of the side wall portion 41. Alternatively, a metal pipe may be insert-molded at the position of each flange portion 411, such that the metal pipe can be used as the bolt hole 411h. In this case, creep deformation of the flange portion 411 can be suppressed.

As a scheme for coupling the bottom plate portion 40 and the side wall portion 41 to each other alternative to use of bolts, an appropriate adhesive agent may be used. When an adhesive agent is used, it is preferable to form a convex portion at one of the bottom plate portion 40 and the side wall portion 41, and to form a concave portion that fits to the convex portion at the other one of the bottom plate portion 40 and the side wall portion 41, such that the position of the side wall portion 41 relative to the bottom plate portion 40 can be uniquely determined. In this case, the bolt holes 411h may not be formed at the side wall portion 41, and the reactor 1 may be fixed to the fixation target by the bottom plate portion 40 being fixed to the fixation target as the bolts being tightened. Thus, as will be described later, when the bottom plate portion 40 is made of a metal material while the side wall portion 41 is made of a resin material, creep deformation of the resin material caused by the bolts being tightened can be suppressed, and the fixation state of the reactor 1 to the fixation target can be prevented from loosening.

(Material)

The constituent material of the case 4 may be, for example, a metal material. Since a metal material generally exhibits excellent thermal conductivity, the case 4 possessing an excellent heat dissipating characteristic can be obtained. The specific metal material may include, for example, aluminum, magnesium, copper, silver, alloy of the foregoing metals, and stainless steel. In particular, using aluminum or alloy thereof, the case 4 being lightweight and exhibiting excellent corrosion resistance can be prepared. When the case 4 is made of a metal material, the case 4 can be formed by plastic working such as press working, without being limited to casting such as die casting.

Further, as the constituent material of the case 4, a non-metal material such as polybutylene terephthalate (PBT) resin, urethane resin, polyphenylene sulfide (PPS) resin, and acrylonitrile butadiene styrene (ABS) resin can be used. Since such resin materials generally possess an excellent electrical insulating characteristic, the insulating characteristic between the combined product 10 and the case 4 can be enhanced. Further, when a filler made of ceramic (see the description of filler of the sealing resin, which will follow) is mixed into the resin material, the heat dissipating characteristic can be improved. When the case 4 is made of resin, injection molding can be suitably used.

Here, the constituent material of the bottom plate portion 40 and that of the side wall portion 41 structuring the case 4 can be selected as appropriate. The bottom plate portion 40 and the side wall portion 41 can be made of a material of the similar type, or they can be made of materials of different types. In particular, it is preferable to structure the bottom plate portion 40 by a metal material such as aluminum, and the side wall portion 41 by a resin material such as PBT resin. In this manner, the heat from the combined product 10 can be quickly dissipated to the cooling base (the fixation target to which the reactor 1 is attached) via the bottom plate portion 40, and the combined product 10 can be effectively insulated from the outside by the side wall portion 41.

<<Insulating Sheet>>

As shown in FIGS. 1 and 2, the insulating sheet 42 is interposed between the bottom plate portion 40 of the case 4 and the coil member 2 of the combined product 10 stored in the case 4. As shown in the drawing, though the insulating sheet 42 is preferably formed over the portion corresponding to the entire bottom face of the combined product 10, it may be formed only over the place corresponding to the coil member 2. Since the insulating sheet 42 is intended to secure electrical insulation between the case 4 (the bottom plate portion 40) and the coil member 2 (the coils 2a and 2b), the insulating sheet 42 is required to possess a prescribed voltage withstanding characteristic (2.5 kV/50 μm or more with the reactor 1). Further, it is preferable for the insulating sheet 42 to possess excellent thermal conductivity such that the heat generated at the coil member 2 (the coils 2a and 2b) can be effectively transferred to the bottom plate portion 40. Preferably, the thermal conductivity of the insulating sheet 42 is as high as possible. For example, the thermal conductivity is 0.1 W/m·K or more, preferably 0.15 W/m·K or more, more preferably 0.5 W/m·K or more, still more preferably 1 W/m·K or more, and particularly preferably 2.0 W/m·K or more.

The thickness of the insulating sheet 42 can be selected as appropriate so as to satisfy the insulating characteristic required between the bottom plate portion 40 and the coil member 2. As to the thickness of the insulating sheet 42, though it depends on the material of the insulating sheet 42, a thickness of approximately 30 μm or more will suffice. Since an excessively thick insulating sheet 42 is meaningless, the upper limit of the thickness of the insulating sheet 42 should be 100 μm. Further, the thickness of the insulating sheet 42 should be set taking into consideration of the thermal conductivity of the employed material also. For example, when the thermal conductivity of the insulating sheet 42 is high (e.g., the epoxy resin insulating sheet=0.7 W/m·K), the insulating sheet 42 may be thicker (e.g., 100 to 300 μm); when the thermal conductivity is low (e.g., the polyimide resin insulating sheet=0.16 W/m·K), the insulating sheet 42 should be reduced in thickness in the range in which insulation between the coil member 2 and the bottom plate portion 40 of the reactor 1 can be secured (e.g., 10 to 50 μm).

The specific material of the insulating sheet 42 may include, for example, amide-imide resin, polyimide resin, polyester resin, and epoxy resin. The voltage withstanding characteristic of the amide-imide resin measuring 50 μm is 7 kV and the thermal conductivity thereof is approximately 0.34 W/m·K; the voltage withstanding characteristic of polyimide resin measuring 50 μm is 7 kV and the thermal conductivity thereof is approximately 0.29 W/m·K; the voltage withstanding characteristic of polyester resin measuring 50 μm is 7 kV and the thermal conductivity thereof is approximately 0.33 W/m·K; and the voltage withstanding characteristic of the epoxy resin measuring 50 μm is 5 kV and the thermal conductivity thereof is approximately 0.7 W/m·K. Alternatively, the insulating sheet 42 containing a ceramic filler may be used. The ceramic may include, for example, silicon nitride (Si3N4), alumina (Al2O3), aluminum nitride (AlN), boron nitride (BN), and silicon carbide (SiC).

The insulating sheet 42 and the bottom plate portion 40 can be bonded to each other by an insulating resin adhesive agent. Further, the insulating sheet 42 and the coil member 2 can also be bonded to each other by an insulating resin adhesive agent. By the adhesive agent being cured, an adhesive agent layer is formed between the insulating sheet 42 and the bottom plate portion 40, and between the insulating sheet 42 and the coil member 2. In connection with the present embodiment, only an adhesive agent layer 8 formed between the insulating sheet 42 and the coil member 2 is illustrated (see the crosshatched portion of the insulating sheet 42 in FIG. 1). As shown in the drawing, it is preferable that the adhesive agent layer 8 extends over the entire surface of the insulating sheet 42. In this manner, the combined product 10 can be strongly fixed to the bottom plate portion 40 of the case 4, and the heat generated from the coil member 2 of the combined product 10 can be effectively transferred to the insulating sheet 42.

Here, though the adhesive agent layer 8 is based on the premise that it has an insulating characteristic (and so is the not-shown adhesive agent layer between the insulating sheet 42 and the bottom plate portion 40), it is mainly intended to surely bond the members. That is, the insulation between the coil member 2 and the bottom plate portion 40 of the reactor 1 is just guaranteed by the insulating sheet 42. Accordingly, the thickness of the adhesive agent layer 8 is not particularly limited. For example, the adhesive agent should be applied by a thickness of approximately 300 to 800 μm to at least one of two members to be joined. Thereafter, the members should be compressed in the direction toward each other such that the adhesive agent layer 8 having a thickness of approximately 20 to 100 μm is formed between them.

The insulating resin structuring the adhesive agent layer 8 may include, for example, silicone resin, acrylic resin, and epoxy resin. In particular, since acrylic resin cures at room temperatures, the curing of resin can be quickly completed. The adhesive agent of the insulating resin may be previously integrated with the insulating sheet 42 as a layer, or may be applied to the insulating sheet 42 later.

Taking into consideration of the foregoing, as the structure of the specific insulating sheet 42, an insulating sheet 42 made up of an epoxy resin-made base material sheet having a thickness of approximately 25 μm and an epoxy resin adhesive agent layer, which is provided on one side of the base material sheet to have a thickness of approximately 30 μm, is prepared, and the adhesive agent layer is bonded on the bottom plate portion 40 side. Subsequently, an adhesive agent of epoxy resin is applied to the other side of the base material sheet to have a thickness of approximately 500 μm, and the reactor 1 is placed thereon. Then, the reactor 1 is pressed from above, such that the adhesive agent on the other side of the base material sheet (on the coil member 2 side) is compressed to have a thickness of approximately 100 μm.

<<Sealing Resin>>

The case 4 is filled with the sealing resin 9 made of an insulating resin. Here, the ends of the wire 2w are drawn outside the case 4, to be exposed outside the sealing resin 9. The sealing resin 9 may include, for example, epoxy resin, urethane resin, and silicone resin. It is preferable for the sealing resin 9 to contain a filler possessing an excellent insulating characteristic and thermal conductivity, e.g., a filler made of at least one type of ceramic selected from silicon nitride, alumina, aluminum nitride, boron nitride, mullite, silica, and silicon carbide, to thereby improve the heat dissipating characteristic of the sealing resin 9.

When the case 4 is filled with the sealing resin 9, it is preferable to dispose a gasket 6 to prevent uncured resin from leaking from a clearance between the bottom plate portion 40 and the side wall portion 41. The gasket 6 according to the present embodiment is an annular element having a size great enough to engage with the outer circumference of the combined product 10 made up of the coil member 2 and the magnetic core 3, and is made of a synthetic rubber. However, any appropriate material can be employed for the gasket 6.

The reactor 1 described above can be used for a power converter apparatus for an electric vehicle or a hybrid vehicle. The energizing conditions of the reactor of such use are: the maximum current (direct current) is approximately 100 A to 1000 A; the average voltage is approximately 100 V to 1000 V; and the working frequency is approximately 5 kHz to 100 kHz.

<<Manufacture of Reactor>>

The reactor 1 structured as described above can be manufactured in the following manner.

Firstly, the combined product 10 is formed by combining the coil member 2 and the magnetic core 3. Specifically, as shown in FIG. 3, the inner core portion 31 (32) is formed by bonding the divided cores 31m and the gap plates 31g to one another by an adhesive agent. As the adhesive agent, an adhesive agent made of room temperature curing acrylic resin should be used.

Next, in the state where the inner bobbin 51 (52) is disposed at the outer circumference of the prepared inner core portion 31 (32), the inner core portion 31 (32) is inserted into the coil 2a (2b). Then, the outer core portion 33 is disposed so as to connect between one ends of the inner core portions 31 and 32 via the frame-like bobbin 53; and the outer core portion 34 is disposed so as to connect between other ends of the inner core portions 31 and 32 via the frame-like bobbin 54. Thus, the combined product 10 is formed. The end face of the inner core portion 31 (32) is exposed outside the opening portion of the frame-like bobbin 53 (54) to be brought into contact with the inner end face of the outer core portion 33 (34). It is preferable to use the acrylic resin adhesive agent also in bonding the inner core portion 31 (32) and the outer core portion 33 (34) to each other.

On the other hand, as shown in FIG. 1, an aluminum plate is punched out into a prescribed shape to form the bottom plate portion 40. Then, on the bottom plate portion 40, the insulating sheet 42 is bonded. The insulating sheet 42 exemplarily shown in the present embodiment has epoxy resin laminated on its one side. By being subjected to thermal pressing, the insulating sheet 42 can be bonded onto the bottom plate portion 40. It goes without saying that the bottom plate portion 40 and the insulating sheet 42 can be bonded to each other by applying an adhesive agent on the bottom plate portion 40.

Next, after the adhesive agent is applied on the insulating sheet 42, the combined product 10 is placed on the insulating sheet 42, and the adhesive agent is cured. Here, in performing the bonding work of the insulating sheet 42 to the bottom plate portion 40 and the attaching work of the combined product 10 onto the insulating sheet 42, since no side wall portion 41 is attached to the bottom plate portion 40, such works can be performed with ease. Note that, it is preferable to employ an acrylic resin as the adhesive agent, because the adhesive agent can be cured at room temperatures.

Next, the side wall portion 41 formed in a prescribed shape by injection molding or the like is disposed from above the combined product 10 so as to surround the outer circumference of the combined product 10. At this time, the gasket 6 is arranged so as to conform to the outer edge portion of the bottom plate portion 40. Then, the bottom plate portion 40 and the side wall portion 41 are integrated by separately prepared bolts (not shown). Through this process, the box-like case 4 is assembled, and the state where the combined product 10 is stored in the case 4 can be achieved.

Finally, the reactor 1 is completed by the case 4 being filled with the sealing resin 9 and the sealing resin 9 being cured.

<<Effect>>

The reactor 1 structured as described above can be manufactured with excellent productivity. That is mainly because of the following reasons (1) to (3).

(1) Insulation between the case 4 and the coil member 2 can be secured with ease by simply allowing the insulating sheet 42 to be interposed between the bottom plate portion 40 of the case 4 and the coil member 2 of the combined product 10.

(2) The completed reactor 1 hardly suffers from troubles because the insulating sheet 42 can be used after verified to have no defect.

(3) The case 4 is made up of the bottom plate portion 40 and the side wall portion 41, which are combined to each other later. Therefore, when the insulating sheet 42 is bonded to the bottom plate portion 40, the side wall portion 41 is not present when the combined product 10 is disposed on the insulating sheet 42.

Second Embodiment

Figure 4:
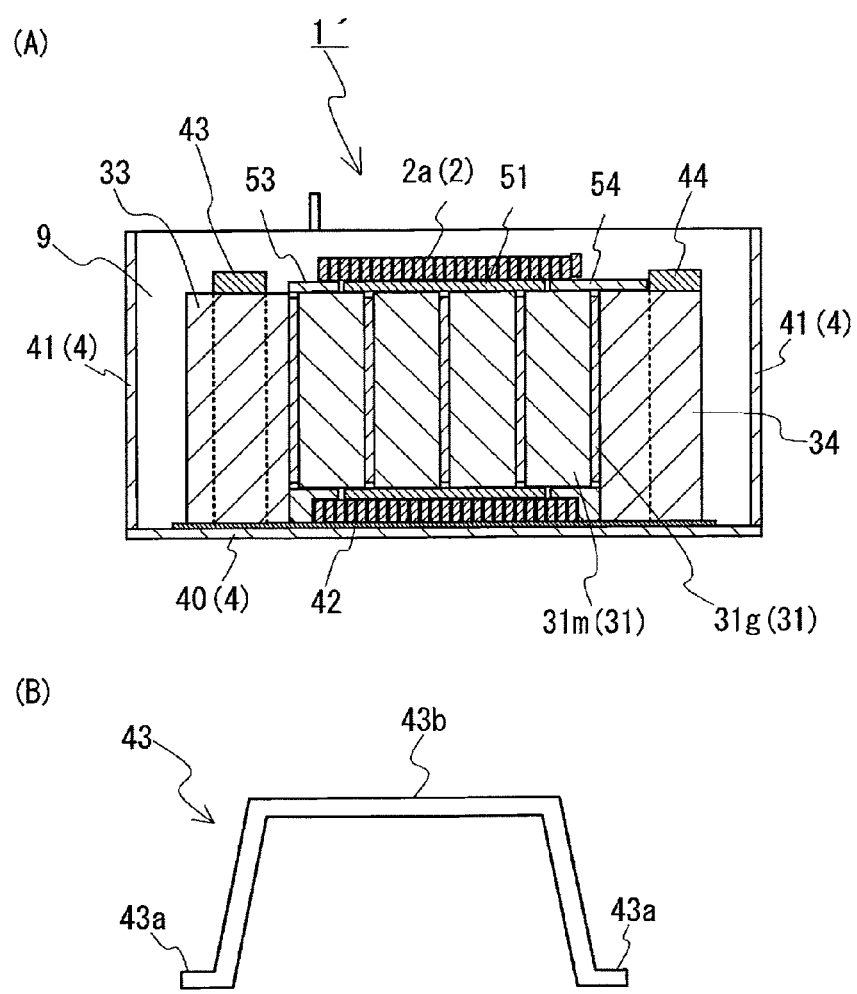
FIG. 4 (A) is a schematic vertical cross-sectional view of a reactor according to a second embodiment, and (B) is a schematic diagram of a fixing fitting (pressing member) used for the reactor shown in (A).

In a second embodiment, with reference to FIG. 4, a description will be given of a reactor 1' in which the combined product 10 is fixed inside the case 4 by pressing members (fixing fittings 43 and 44). The structure other than the fixing fittings 43 and 44 is identical to that in the first embodiment.

With the reactor 1', no adhesive layer is formed between the insulating sheet 42 and the combined product 10. Instead, in order to bring the insulating sheet 42 and the combined product 10 into close contact with each other, the fixing fittings 43 and 44 are used. The fixing fittings 43 and 44 are each overhead bridge-like. Opposite end portions 43a and 43a of the fixing fitting 43 are fixed to the bottom plate portion 40, and an intermediate portion 43b thereof abuts on the top face of the outer core portion 33 or 34 (particularly, see FIG. 4 (B)). Accordingly, by the fixing fittings 43 and 44, the outer core portions 33 and 34 are pressed toward the bottom plate portion 40 and fixed thereto. Note that, the fixing place of the opposite end portions 43a and 43a can be the side wall portion 41.

Alternatively, in place of the fixing fittings 43 and 44, a leaf spring may be used to bring the insulating sheet 42 and the combined product 10 into close contact with each other. In this case, though not shown in the drawing, one end of the leaf spring should be fixed to the bottom plate portion 40 or the side wall portion 41, and the other end thereof should be abutted on the top face of the outer core portions 33 and 34. At this time, by allowing the leaf spring to be deflected, the state where the outer core portions 33 and 34 are pressed by the bottom plate portion 40 can be achieved.

Third Embodiment

The reactor according to any of the first and second embodiments may be used, for example, as a constituent component of a converter mounted on a vehicle or the like, or as a constituent component of a power converter apparatus including the converter.

Figure 5:
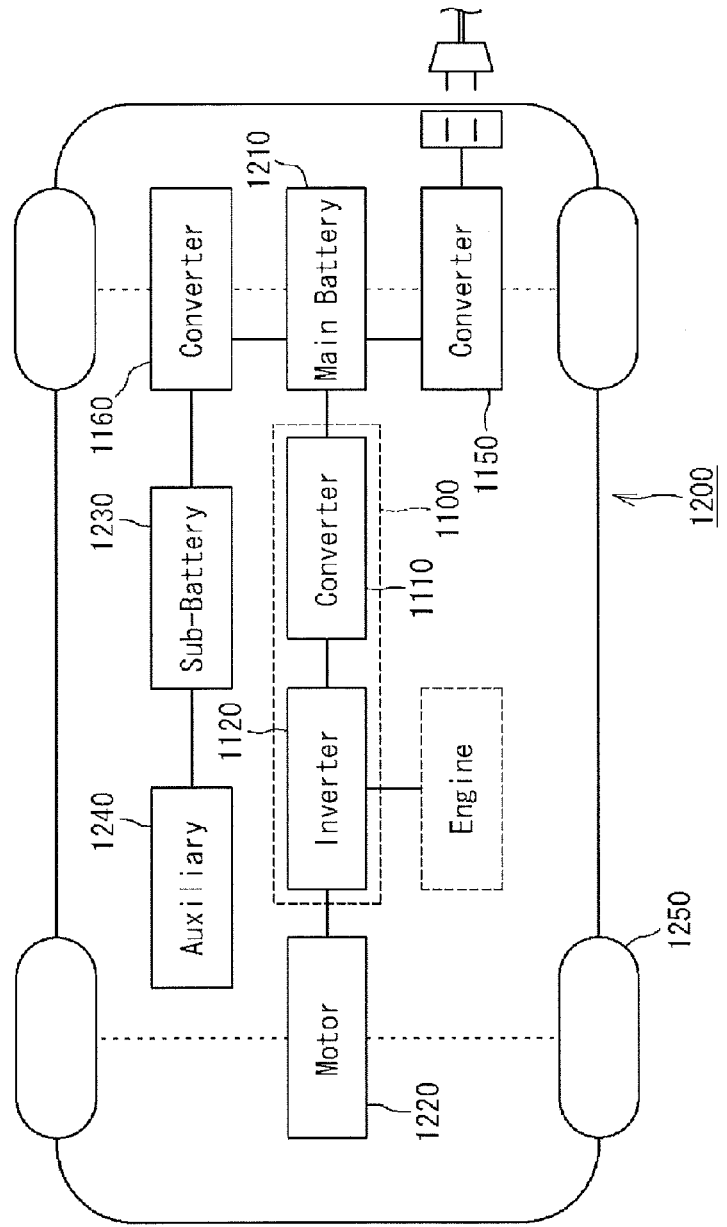
FIG. 5 is a schematic configuration diagram schematically showing a power supply system of a hybrid vehicle.

For example, as shown in FIG. 5, a vehicle 1200 such as a hybrid vehicle or an electric vehicle includes a main battery 1210, a power converter apparatus 1100 connected to the main battery 1210, and a motor (a load) 1220 driven by power supplied from the main battery 1210 and serves for traveling. The motor 1220 is representatively a three-phase alternating current motor. The motor 1220 drives wheels 1250 in the traveling mode and functions as a generator in the regenerative mode. In the case of a hybrid vehicle, the vehicle 1200 includes an engine in addition to the motor 1220. Though an inlet is shown as a charging portion of the vehicle 1200 in FIG. 5, a plug may be included.

The power converter apparatus 1100 includes a converter 1110 connected to the main battery 1210 and an inverter 1120 connected to the converter 1110 to perform interconversion between direct current and alternating current. When the vehicle 1200 is in the traveling mode, the converter 1110 in this example steps up DC voltage (input voltage) of approximately 200 V to 300 V of the main battery 1210 to approximately 400 V to 700 V, and supplies the inverter 1120 with the stepped up power. Further, in the regenerative mode, the converter 1110 steps down DC voltage (input voltage) output from the motor 1220 through the inverter 1120 to a DC voltage suitable for the main battery 1210, such that the main battery 1210 is charged with the DC voltage. When the vehicle 1200 is in the traveling mode, the inverter 1120 converts the direct current stepped up by the converter 1110 to a prescribed alternating current and supplies the motor 1220 with the alternating current. In the regenerative mode, the inverter 1120 converts the AC output from the motor 1220 into direct current, and outputs the direct current to the converter 1110.

Figure 6:
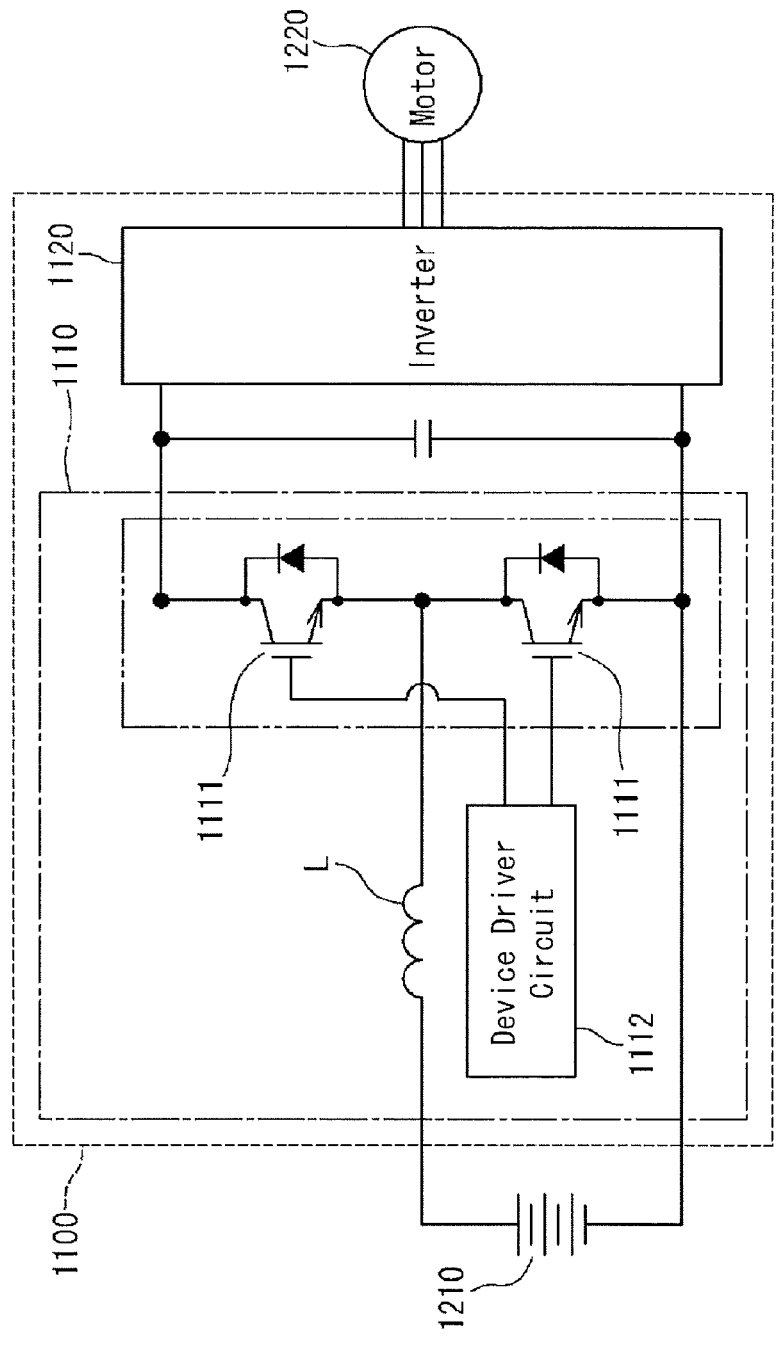
FIG. 6 is a schematic circuit diagram showing one example of a power converter apparatus of the present invention including a converter of the present invention.

As shown in FIG. 6, the converter 1110 includes a plurality of switching elements 1111, a driver circuit 1112 that controls operations of the switching elements 1111, and a reactor L. The converter 1110 converts (here, performs step up and down) the input voltage by repetitively performing ON/OFF (switching operations). As the switching elements 1111, power devices such as FETs and IGBTs are used. The reactor L uses a characteristic of a coil that disturbs a change of current which flows through the circuit, and hence has a function of making the change smooth when the current is increased or decreased by the switching operation. The reactor L is the reactor according to any of the embodiments described above. Since the reactor 1 or 1' with excellent productivity is included, the power converter apparatus 1100 and the converter 1110 are also excellent in productivity.

Note that the vehicle 1200 includes, in addition to the converter 1110, a power supply apparatus-use converter 1150 connected to the main battery 1210, and an auxiliary power supply-use converter 1160 connected to a sub-battery 1230 serving as a power supply of auxiliary equipment 1240 and to the main battery 1210, to convert a high voltage of the main battery 1210 to a low voltage. The converter 1110 representatively performs DC-DC conversion, whereas the power supply apparatus-use converter 1150 and the auxiliary power supply-use converter 1160 perform AC-DC conversion. Some types of the power supply apparatus-use converter 1150 perform DC-DC conversion. The power supply apparatus-use converter 1150 and the auxiliary power supply-use converter 1160 each may be structured similarly to the reactor according to any of the foregoing embodiments or variations, and the size and shape of the reactor may be changed as appropriate. Further, the reactor according to any of the foregoing embodiments may be used as a converter that performs conversion for the input power and that performs only stepping up or stepping down.

Note that the present invention is not limited to the embodiments described above, and can be practiced as being modified as appropriate within a range not departing from the gist of the present invention.

INDUSTRIAL APPLICABILITY

The reactor of the present invention can be suitably used as a constituent component of a power converter apparatus, such as an in-vehicle converter of a hybrid vehicle, an electric vehicle, a fuel cell vehicle and the like.

REFERENCE SIGNS LIST

1, 1': REACTOR
2: COIL MEMBER
2a, 2b: COIL
2r: COIL COUPLING PORTION
2w: WIRE
3: MAGNETIC CORE
31, 32: INNER CORE PORTION
31m: DIVIDED CORE (CORE PIECE)
31g: GAP PLATE
33, 34: OUTER CORE PORTION (CORE PIECE)
4: CASE
40: BOTTOM PLATE PORTION
400: FLANGE PORTION
400h: BOLT HOLE
41: SIDE WALL PORTION
411: FLANGE PORTION
411h: BOLT HOLE
42: INSULATING SHEET
43, 44: FIXING FITTING (PRESSING MEMBER)
43a: OPPOSITE ENDS
43b: INTERMEDIATE PORTION
5: BOBBIN
51, 52: INNER BOBBIN
51a, 51b: BOBBIN PIECE
53, 54: FRAME-LIKE BOBBIN
54f: FLANGE PORTION
6: GASKET
7: ADHESIVE LAYER
8: ADHESIVE AGENT LAYER
9: SEALING RESIN
10: COMBINED PRODUCT
1100: POWER CONVERTER APPARATUS
1110: CONVERTER
1111: SWITCHING ELEMENT
1112: DRIVER CIRCUIT
L: REACTOR
1120: INVERTER
1150: POWER SUPPLY APPARATUS-USE CONVERTER
1160: AUXILIARY POWER SUPPLY-USE CONVERTER
1200: VEHICLE
1210: MAIN BATTERY
1220: MOTOR
1230: SUB-BATTERY
1240: AUXILIARY EQUIPMENT
1250: WHEELS

The invention claimed is:
1. A reactor comprising:
a coil member having a pair of coils being coupled to each other in a paralleled state;
an annular magnetic core penetrating through the coils; and a case storing a combined product made up of the coil member and the magnetic core, wherein the case has:

a side wall portion surrounding the combined product; and a bottom plate portion being a member separate from the side wall portion, the bottom plate portion being attached to the side wall portion without interposition of an insulating sheet, the reactor further comprising the insulating sheet interposed between the bottom plate portion and the coil member, the insulating sheet is bonded to the bottom plate portion in the state that the side wall portion is not present.

2. The reactor according to claim 1, wherein the insulating sheet is one of amide-imide resin, polyimide resin, epoxy resin, and polyester resin.

3. The reactor according to claim 1, further comprising an adhesive agent layer disposed at least at one of a position between the bottom plate portion and the insulating sheet and a position between the insulating sheet and the coil member.

4. The reactor according to claim 3, wherein the adhesive agent layer is obtained by curing of one of the silicone resin, the acrylic resin, and the epoxy resin.

5. The reactor according to claim 1, further comprising a pressing member pressing the combined product against the bottom plate portion.

6. The reactor according to claim 1, wherein the side wall portion is made of a resin material, and the bottom plate portion is made of a metal material.

7. A method for manufacturing a reactor, the reactor according to claim 1, the method comprising:

a step A of preparing the combined product;

a step B of preparing the side wall portion and the bottom plate portion, the side wall portion and the bottom plate portion forming the case as being combined;

a step C of placing the combined product on the bottom plate portion having the insulating sheet interposed between the bottom plate portion and the coil member; and a step D of allowing the side wall portion and the bottom plate portion to engage with each other so as to surround the combined product placed on the bottom plate portion.

8. A converter comprising:

a switching element;

a driver circuit controlling an operation of the switching element; and a reactor smoothing a switching operation, wherein the converter converts an input voltage in accordance with the operation of the switching element, and the reactor is the reactor according to claim 1.

9. A power converter apparatus comprising:

a converter converting an input voltage; and an inverter connected to the converter to mutually convert a direct current and an alternating current, the power converter driving a load by power converted by the inverter, wherein the converter is the converter according to claim 8.

* * * * *